United States Patent
Liu et al.

(10) Patent No.: US 9,418,316 B1
(45) Date of Patent: Aug. 16, 2016

(54) SHARPNESS-BASED FRAME SELECTION FOR OCR

(71) Applicant: Amazon Technologies, Inc., Seattle, WA (US)

(72) Inventors: Yue Liu, Brighton, MA (US); Qingfeng Yu, Belmont, MA (US); Xing Liu, West Lafayette, IN (US); Pradeep Natarajan, Lexington, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/500,208

(22) Filed: Sep. 29, 2014

(51) Int. Cl.
  *G06K 9/62* (2006.01)
  *G06K 9/66* (2006.01)
  *G06K 9/18* (2006.01)

(52) U.S. Cl.
  CPC ............... *G06K 9/6256* (2013.01); *G06K 9/18* (2013.01); *G06K 9/66* (2013.01)

(58) Field of Classification Search
  CPC ......... G06K 9/6256; G06K 9/18; G06K 9/66; G06K 9/00671; G06K 9/46; G06K 2209/01; G06K 2209/15; G06K 9/3258; G06K 9/00; G06K 9/00456; G06K 9/228; G06K 9/4604; G06F 17/30253; G06F 17/30256
  See application file for complete search history.

(56) References Cited

U.S. PATENT DOCUMENTS

| | | | | |
|---|---|---|---|---|
| 8,965,117 B1* | 2/2015 | Rybakov | | G06K 9/18 382/162 |
| 2003/0026480 A1* | 2/2003 | Karidi | | G06K 9/00456 382/176 |
| 2004/0136586 A1* | 7/2004 | Okamura | | G06K 9/38 382/137 |
| 2005/0213120 A1* | 9/2005 | Ohkawa | | G06T 3/4007 358/1.9 |
| 2006/0221402 A1* | 10/2006 | Jiang | | G06Q 10/10 358/3.22 |
| 2007/0061023 A1* | 3/2007 | Hoffberg | | G05B 19/0426 700/83 |
| 2008/0068660 A1* | 3/2008 | Loce | | H04N 1/40075 358/3.06 |
| 2008/0298642 A1* | 12/2008 | Meenen | | G06K 9/00 382/115 |
| 2009/0284801 A1* | 11/2009 | Sakaue | | H04N 1/40062 358/3.27 |
| 2010/0259676 A1* | 10/2010 | Swan | | G06K 9/3266 348/468 |
| 2013/0028481 A1* | 1/2013 | Wu | | G06T 5/006 382/105 |

(Continued)

OTHER PUBLICATIONS

Ferzli, et al. A No-Reference Objective Image Sharpness Metric Based on the Notion of Just Noticeable Blur (JNB). Image Processing, IEEE Transactions, vol. 18, No. 4, pp. 717-728, Apr. 2009.

(Continued)

*Primary Examiner* — Jingge Wu
(74) *Attorney, Agent, or Firm* — Seyfarth Shaw LLP; Ilan N. Barzilay; Cyrus A. Miller

(57) ABSTRACT

A process for training and optimizing a system to select video frames for optical character recognition (OCR) based on feature metrics associated with blur and sharpness. A set of image frames are subjectively labelled based on a comparison of each frame before and after binarization to determine to what degree text is recognizable in the binary image. A plurality of different sharpness feature metrics are generated based on the original frame. A classifier is then trained using the feature metrics and the subjective labels. The feature metrics are then tested for accuracy and/or correlation with subjective labelling data. The set of feature metrics may be refined based on which metrics produce the best results.

12 Claims, 11 Drawing Sheets

(56) References Cited

U.S. PATENT DOCUMENTS

| | | | |
|---|---|---|---|
| 2013/0155474 A1* | 6/2013 | Roach | G06Q 20/322 358/505 |
| 2014/0002661 A1* | 1/2014 | Wu | H04N 5/772 348/149 |
| 2014/0049799 A1* | 2/2014 | Li | H04N 1/4092 358/3.27 |
| 2014/0067631 A1* | 3/2014 | Dhuse | G06Q 40/10 705/30 |
| 2015/0063720 A1* | 3/2015 | Maltz | G06T 5/007 382/284 |

OTHER PUBLICATIONS

Marziliano, et al. Perceptual Blur and Ringing Metrics: Application to JPEG2000. Signal Processing: Image Communication, vol. 19, No. 2, pp. 163-172, 2004.

Matas, et al. Robust Wide Baseline Stereo from Maximally Stable Extremal Regions. Image and Vision Computing. vol. 22, No. 10, British Machine Vision Computing 2002—Special Issue, pp. 384-393, 2004.

Sezgin, et al. Survey Over Image Thresholding Techniques and Quantitative Performance Evaluation. Journal of Electronic Imaging. vol. 13, No. 1, pp. 146-168, 2004.

\* cited by examiner

Combined dx+dy Sobel Filter Frame (Inverted) 222

Threholded Sobel Filter Frame 322

SHARPNESS-BASED FRAME SELECTION FOR OCR

BACKGROUND

Mobile electronic devices such as tablet computers and smart phones commonly include cameras. Software on the mobile device may process captured images to identify and recognize text and glyph symbols.

BRIEF DESCRIPTION OF DRAWINGS

For a more complete understanding of the present disclosure, reference is now made to the following description taken in conjunction with the accompanying drawings.

DETAILED DESCRIPTION

Individual frames of digital video tend to contain more blur than still images such as photographs. There are a variety of reasons for this. For example, in still-image photography, more time is typically available for an auto-focus system and/or a user to adjust camera focus, resulting in sharper images. Another example is "motion blur" caused when the camera moves and/or a subject in the frame moves, which may go unnoticed when shooting video. The human eye can compensate for blur in individual frames when viewing the frames in rapid succession, such that video that "appears" sharp may actually contain a significant amount of blur.

When performing object recognition or text recognition using frame from real-time video shot by a hand-held camera, the blur in individual frames can significantly diminish recognition accuracy and overall performance. Selecting high quality video frames is important, but can be computationally challenging—particularly if recognition is performed in real-time while the video is being shot. Choosing good features by which to analyze frames is one step of a robust frame selection mechanism. Improving selection of high quality frames improves recognition accuracy and reduces the computational cost.

Figure 1:
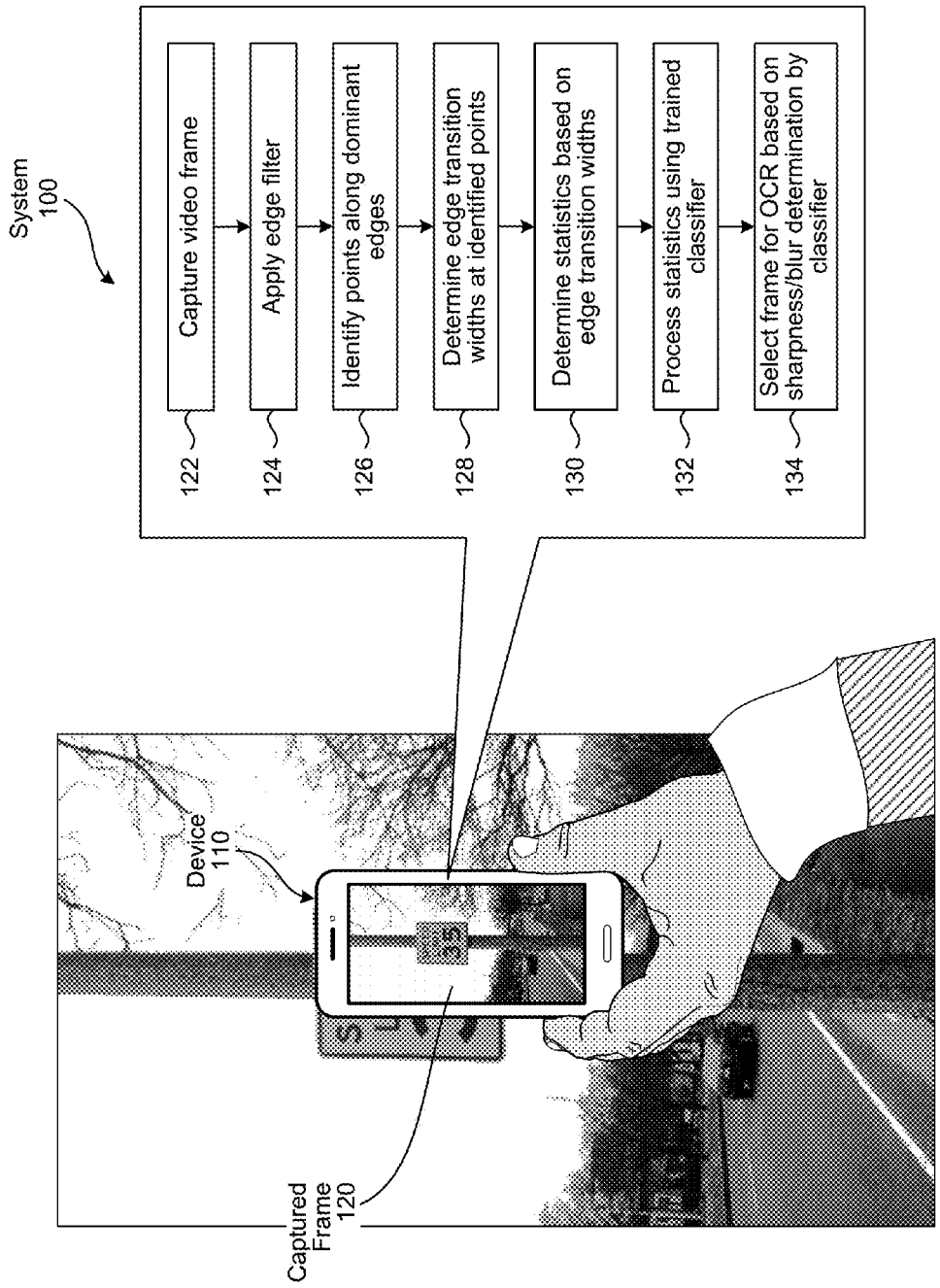
FIG. 1 illustrates a system for selecting video frames for optical character recognition (OCR) based on the sharpness/blur in the frame.

FIG. 1 illustrates a system 100 for selecting frames to be processed by optical character recognition (OCR) based on sharpness/blur feature metrics. A device 110 captures (122) a video frame 120 containing text characters. An edge filter is applied (124) to the video frame to identify edges within each captured frame 120. An "edge map" is created, comprising gradient features from the output of the edge filter in the horizontal ("X") and vertical ("Y") directions. Based on the edge map, points are identified (126) along dominant edges. Edge transition widths are determined (128) in the frame at those points. Sharper features will have smaller edge transition widths than blurry features.

Statistics are determined (130) based on the edge transition widths. The statistics are processed (132) by a trained image classifier, which assigns the frame a score characterizing the frame's sharpness/blur based on the statistics. If the value of the score indicates that the frame is of high quality, the frame is selected (134) for processing by OCR.

An example of an edge filter is a Sobel filter. The filter computes an approximation of the derivative of an image intensity function for each pixel in an image in the horizontal (X direction) and vertical (Y direction) as gradient approximations. Typically, a Sobel filter uses a 3×3 region around each pixel to approximate that pixel's image gradient. The X and Y gradient approximations for each pixel can be combined to provide a gradient magnitude. The direction of the intensity gradient at each pixel may be determined by taking the arctan of the Y gradient divided by the X gradient.

Figure 2:
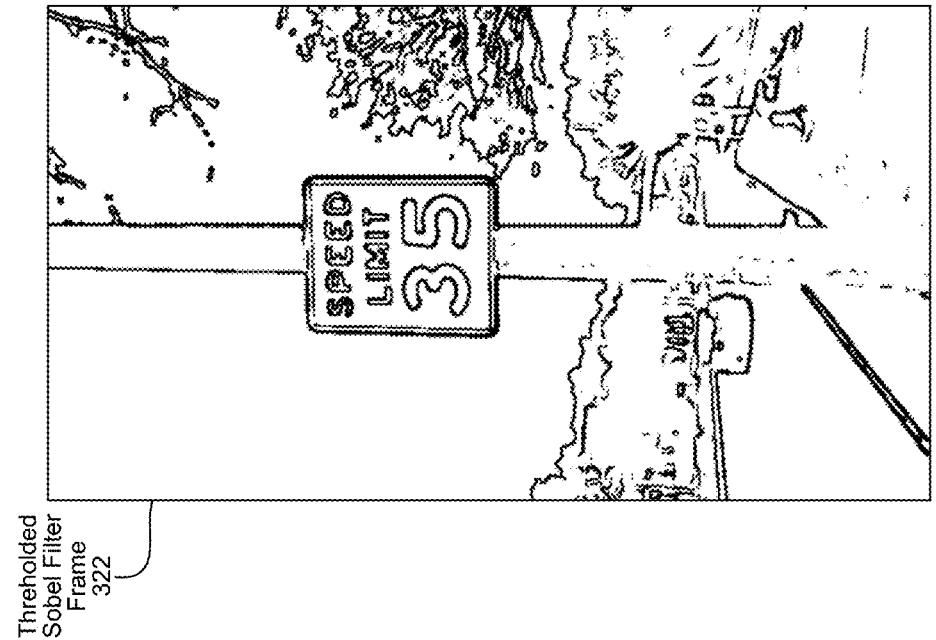
FIG. 2 is an example of a captured frame processed using an edge-detection filter.

FIG. 2 illustrates an image 222 created from a combined result of the X gradient "dx" and the Y gradient "dy" from the Sobel filter, and then inverting the image. Prior to being inverted, each pixel corresponds to a norm of dx plus a norm of dy (i.e., |dx|+|dy|). The image 222 has been inverted for printing reproduction purposes. If the image was not inverted, areas where there are no or small intensity gradients (e.g., the sky) would appear to be black, and areas where there are large intensity gradients (e.g., edges) would appear to be white. Intermediate gradients result in pixels in varying shades of grey.

Figure 3:
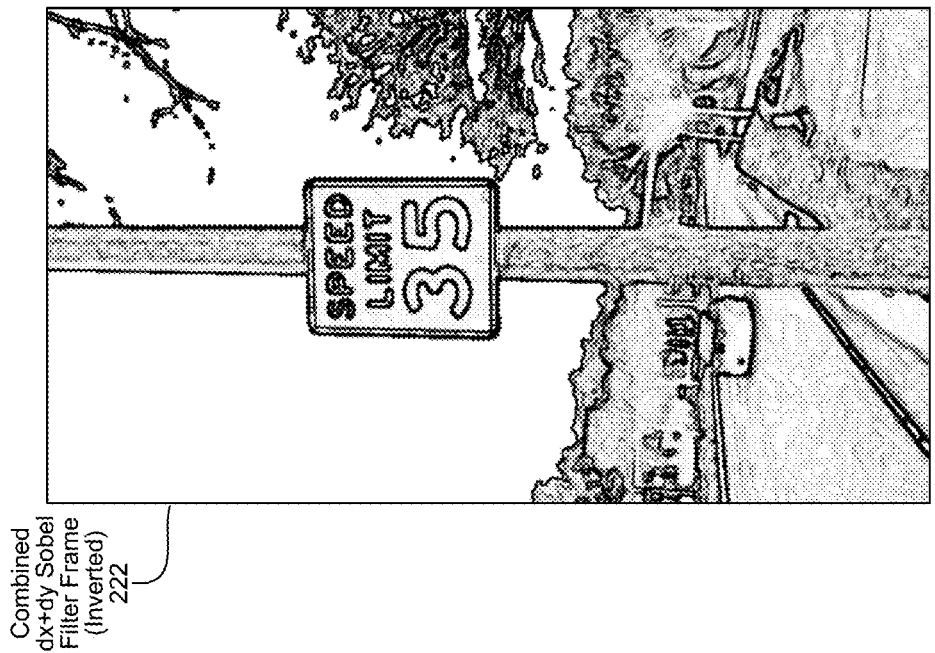
FIG. 3 illustrates dominant edges in the edge-processed frame after a threshold is applied.

Sobel edge detection is computationally faster than Canny edge detection. However, Sobel edge detection is not as accurate as Canny, and fake edges within noisy regions are not excluded in the results. As illustrated in FIG. 2, the gradients produced by textured surfaces results (e.g., the surface of the pole) produce a multitude of intermediate gradients that can be characterized as false edges. By applying a threshold to the filter frame 222, "dominant" edges may be distinguished from false edges and image noise. The dominant edges are highlighted in the frame 322 in FIG. 3, where a threshold has been applied to the filter frame 222. As illustrated, pixels with a value below the threshold are made white, and pixels with a value above the threshold are made black. Thresholding may be based on a static threshold (e.g., a fixed threshold value or percentage) as illustrated in FIG. 3, or an adaptive thresholding technique may be applied. If adaptive thresholding is applied, the threshold may be determined locally for each pixel, or uniformly for the entire frame. For a background overview that provides examples of various thresholding techniques, see Mehmet Sezgin and Bulent Sankur, "Survey over image thresholding techniques and quantitative performance evaluation," Journal of Electronic Imaging Vol. 13(1), pp. 146-165 (January 2004), which is incorporated herein by reference.

Figure 4:
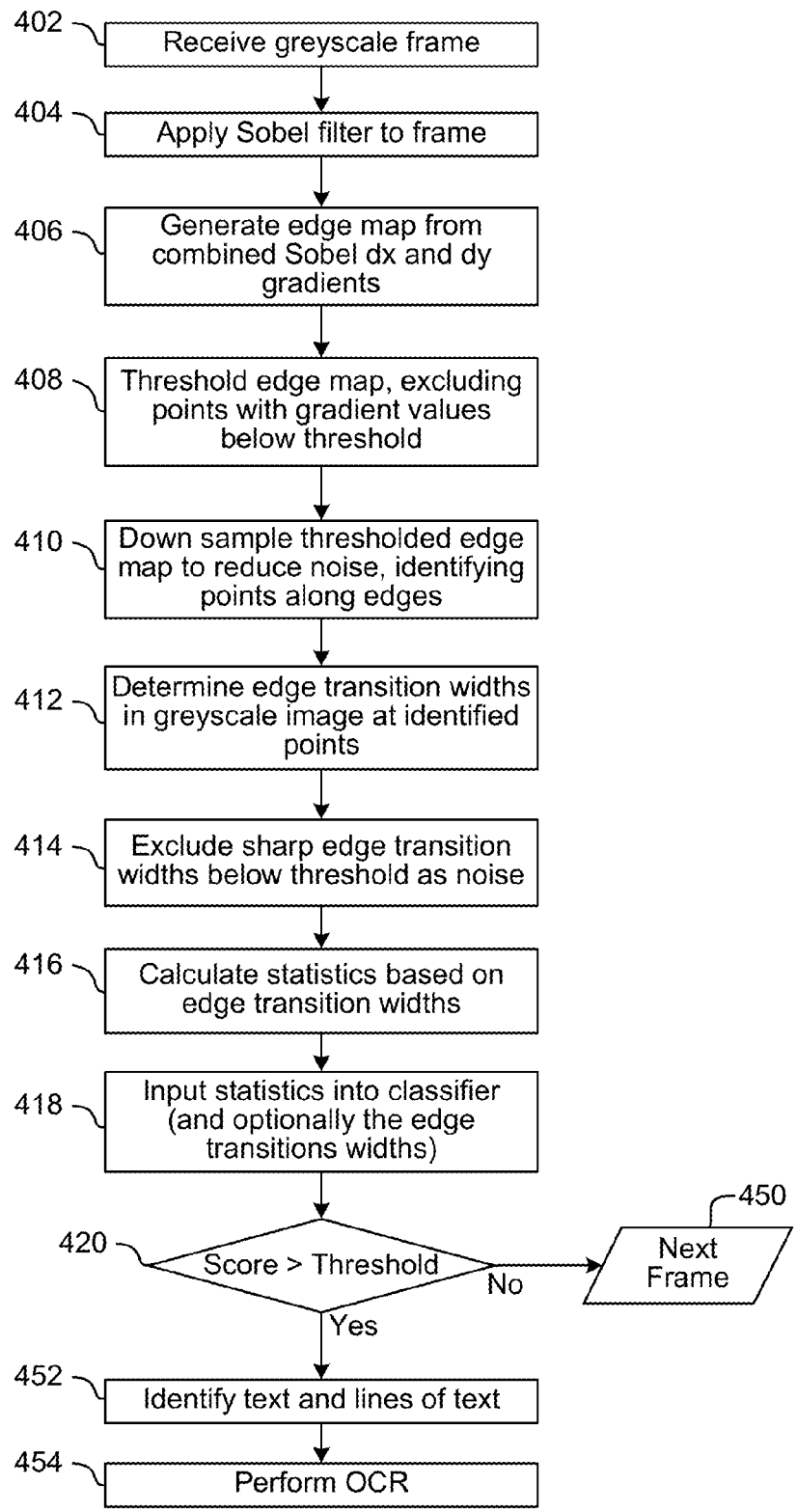
FIG. 4 illustrates an example of the process performed by the system of FIG. 1, selecting a frame for OCR based on sharpness/blur.

FIG. 4 illustrates a version of the process used by the system 100 to select high quality frames for further processing. As illustrated, the further processing is optical character recognition (OCR), but the frame selection principles are equally applicable to other types of image processing where blur within the frame can diminish performance.

After a video frame is captured, if not captured in greyscale (e.g., color), it may be converted into greyscale. In addition, prior to applying the illustrated process, some frames may be rejected for other reasons. For example, a frame may be rejected based on a focus metric determined by a camera's autofocus system, or because an amount of motion determined by comparing consecutive frames exceeds a threshold value.

After a greyscale frame is received (402), a Sobel filter is applied (404) to determine image intensity gradients in the X and Y directions. An edge map is generated (406) by adding the magnitude of the dx gradients to the magnitude of the dy gradients for a pixel/point to determine that pixel/point's value, as discussed above in connection to FIG. 2 and provided in Equation 1 as follows:

$$\text{Pixel} = |dx| + |dy| \quad (1)$$

As an alternative to Equation 1, a magnitude of each pixel's gradient may be determined as provided in Equation 2 as follows:

$$\text{Pixel} = \sqrt{dx^2 + dy^2} \quad (2)$$

However, the calculation of the square root is computationally costly. Therefore, a magnitude of each gradient may approximated based on Equation 3 as follows:

$$\text{Pixel} = \sqrt{dx^2 + dy^2} \approx \frac{1}{2}(1 + 1/4 - 2\sqrt{2}) \min(\max(|dx|, |dy|), |dx| + |dy|/\sqrt{2}) \quad (3)$$

The right-hand side of the above Equation 3 is the approximation of magnitude. The square root of two is a constant, and thus, can be pre-calculated or hard-coded. This approximation produces an error of approximately 4% in the magnitude computation, but the elimination square root of the gradient values reduces computational overhead.

Fixed or adaptive thresholding (408) is applied to the edge map as described above in connection to FIG. 3 to determine "dominant" edges by excluding gradient data from points/pixels with gradient values below a threshold.

Figure 5:
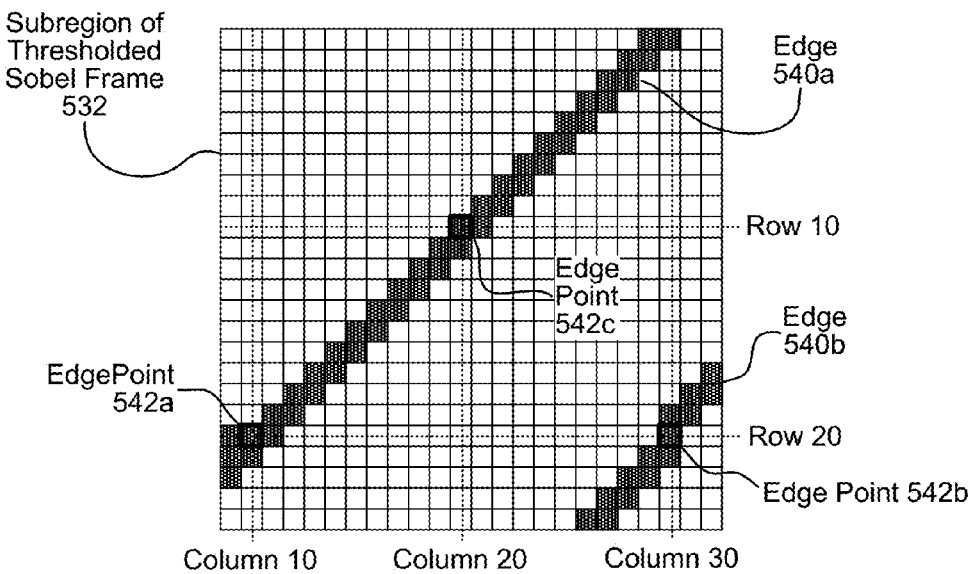
FIG. 5 illustrates an example of how the system identifies points along the dominant edges.

The thresholded edge map is scanned (410) to identify points along the dominant edges. A down sampling technique may be used to further reduce the influence of image noise on the results and to reduce computational complexity of the process. For example, FIG. 5 illustrates a subregion 532 of the thresholded edge map frame 322. Down sampling is accomplished by scanning an intersection of every tenth row and every tenth column to determine whether the intersecting point/pixel is part of an edge (instead of scanning every pixel). In FIG. 5, edge points 542a and 542c are along a first edge 540a, and edge point 542b is along a second edge 540b.

The choice of using every tenth row and every tenth column is intended as an example of down sampling, and a different sample spacing may be used. For example, the spacing may be determined as a percentage of one or both of the dimensions of the image, with smaller images having a smaller spacing (e.g., every fifth row and column) and larger images having a larger spacing (e.g., every twentieth row and column).

Down sampling (410) speeds up calculation and reduces the number of edges, further eliminating the statistical significance of edges that that are noise that make it past the thresholding process. The validity of down sampling is based on the assumption that close edges represent similar information.

For each of the edge points 542 identified based on the edge map, an edge transition width is determined (412) using pixel data in the original greyscale image. The edge transition width is defined as the distance between opposing local maximum and minimum pixels around the edge pixel. The local maximum is determined by scanning along a line intersecting the edge point 542 in a direction of increasing image intensity until reaching a pixel after which the image intensity plateaus (e.g., reaches a stable level) or declines. The local minimum is determined by scanning along the line in an opposite direction of decreasing image intensity until reaching a pixel after which the image intensity plateaus or increases. Whether a plateau has been reached is determined by comparing an intensity value of a pixel along the line with a next pixel along the line. The determination as to whether an intensity plateau has been reached may be based on the current pixel and the next pixel having a same value, or may be approximated based on the amount or rate of change in intensity between the current pixel and the next pixel falling below a threshold value.

Figure 6:
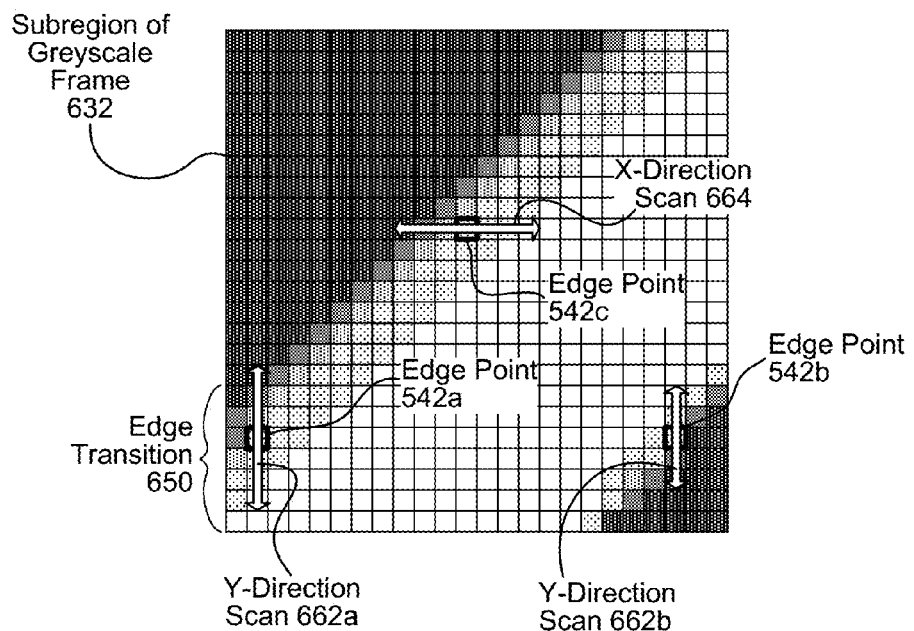
FIG. 6 illustrates an example of how the system determines edge transition widths at the identified points.

FIG. 6 illustrates a subregion 632 of the original greyscale frame in which edge transitions widths are determined (412) corresponding to edge points 542a to 542c. The edge transition width is the width of the region in which there is a contrast gradient, which will be wider in blurrier images than in sharp images. Likewise, the slope of the gradient will be less in a blurry image than it will be in a sharp image. An example of an edge transition width 650 in the left-most column of the subregion 632 is illustrated along the left edge of FIG. 6.

For each edge point, the X and Y gradients output by the Sobel filter may be compared. For example, if a magnitude of the dy for an edge point is larger than a magnitude of dx for that edge point, then the pixels in the column above and below the edge point are scanned in opposite directions to determine the local maximum and the local minimum pixels. For edge points 542a and 542b, scan 662a and scan 662b are performed in the Y direction. Similarly, if a magnitude of dx for an edge point is larger than the magnitude of dy for that edge point, then the pixels in the row to the left and right of the edge point are scanned in opposite directions to determine the local maximum and minimum pixels. For example, for edge point 542c, an X-direction scan 664 is performed.

Alternative approaches to scanning for the edge transition widths may be used, such as scanning all identified edge points 542 in the X-direction, scanning all identified edge points 542 in the Y-direction, or scanning all identified edge points in both the X and the Y directions. As another alternative, either the actual angle of the intensity gradient relative to an edge point 542 or a quantized approximation of the actual angle may be used to determine the direction of the scan. The actual angle may be determined as arctan of dy/dx, with the angle providing the scan direction (e.g., scanning in FIG. 6 in opposite directions from each edge point 542 at an angle orthogonal to edge 540a and edge 540b). However, since calculation of an arctan can be computationally costly, a quantization method may be used to determine the scanning angle as an approximation based on relative magnitudes of the X gradient (dx) and the Y gradient (dy) produced by the Sobel filter (in 404) for each respective edge point 542. An example of such an approximation is illustrated in Table 1:

TABLE 1

| Scan Angle (Degrees) | Actual Gradient Angle (Degrees) | Gradient Values |
| --- | --- | --- |
| 0 | $0 \leq \theta < 45$ | $0 \leq |+dy| < |+dx|$ |
| 45 | $45 \leq \theta < 90$ | $|+dx| \leq |+dy|$ |

TABLE 1-continued

| Scan Angle (Degrees) | Actual Gradient Angle (Degrees) | Gradient Values |
|---|---|---|
| 90 | 90 ≤ θ < 135 | 0 ≤ \|−dx\| < \|+dy\| |
| 135 | 135 ≤ θ < 180 | \|+dy\| ≤ \|−dx\| |
| 180 | 180 ≤ θ < 225 | 0 ≤ \|−dy\| < \|−dx\| |
| 225 | 225 ≤ θ < 270 | \|−dx\| ≤ \|−dy\| |
| 270 | 270 ≤ θ < 315 | 0 ≤ \|+dx\| < \|−dy\| |
| 315 | 315 ≤ θ < 360 | \|−dy\| ≤ \|+dx\| |

The gradient polarity (positive or negative) indicates a direction of the gradient. However, since scanning occurs in opposite directions from each edge point 542, a scan along a gradient in a direction of 0 degrees is the same as a scan along a gradient in a direction of 180 degrees. Likewise, 45 degrees and 225 degrees result in a same scan, 90 degrees and 270 degrees is a same scan, and 135 degrees and 315 degrees results in a same scan. Thus, Table 1 can be simplified to produce scans in four directions (e.g., horizontal, vertical, and two diagonals):

TABLE 2

| Scan Angle | Gradient Values |
|---|---|
| Vertical | 0 ≤ \|+dy\| < \|+dx\| |
| 45° Diagonal | \|+dx\| ≤ \|+dy\| |
| Horizontal | 0 ≤ \|−dx\| < \|+dy\| |
| 135° Diagonal | \|+dy\| ≤ \|−dx\| |
| Vertical | 0 ≤ \|−dy\| < \|−dx\| |
| 45° Diagonal | \|−dx\| ≤ \|−dy\| |
| Horizontal | 0 ≤ \|+dx\| < \|−dy\| |
| 135° Diagonal | \|−dy\| ≤ \|+dx\| |

A threshold value is used to exclude (414) exceptionally sharp edge transition width values that are likely fake edges. By heuristic observation of the data set, even a sharp frame will have an overall edge transition width score higher than four pixels. However, the local edge transition width for a noisy point is consistently one or two pixels. Therefore, edges with an edge transition width that is two pixels or less can be excluded from the calculation of the overall edge transition width. This helps to remove the noisy information that remains after thresholding to a large extent.

Statistics characterizing sharpness and/or blur are calculated (416) based on the edge transition widths. Examples of statistics characterizing image sharpness/blur features that are effective as metrics for determining the sharpness quality of a frame are the mean (average) edge transition width for the frame, and the variance of the edge transition width. Other examples of such statistics are the median edge transition width and the standard deviation. Since standard deviation is the square root of the variance, and square roots are computationally costly, variance is easier to calculate. However, standard deviation has the same dimensions as the edge transition width data, and therefore is comparable to deviations from the mean.

The statistics are input (418) into a trained classifier as feature metrics, which the classifier uses to determine a sharpness/blur score for the frame. The edge transition widths may also be entered into the classifier, along with other feature metrics, such as feature metrics relating to the minimum-maximum range of the image intensities/contrast, metrics relating to motion/changes relative to proceeding frames, etc.

Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

Based at least in part on the statistics derived from the edge transition widths, the classifier assigns a score to each frame characterizing the frame's sharpness/blur characteristics. Based on this score exceeding a threshold sharpness value (420 "Yes"), the frame is selected as a good quality frame, and used for additional image processing, such as identifying (452) text and lines of text in the frame, and performing (454) OCR on the resulting lines of text. If the classifier score does not exceed the threshold sharpness value (420 "No"), the frame is rejected and the process proceeds to analyze the next frame (450) upon receipt.

Figure 7:
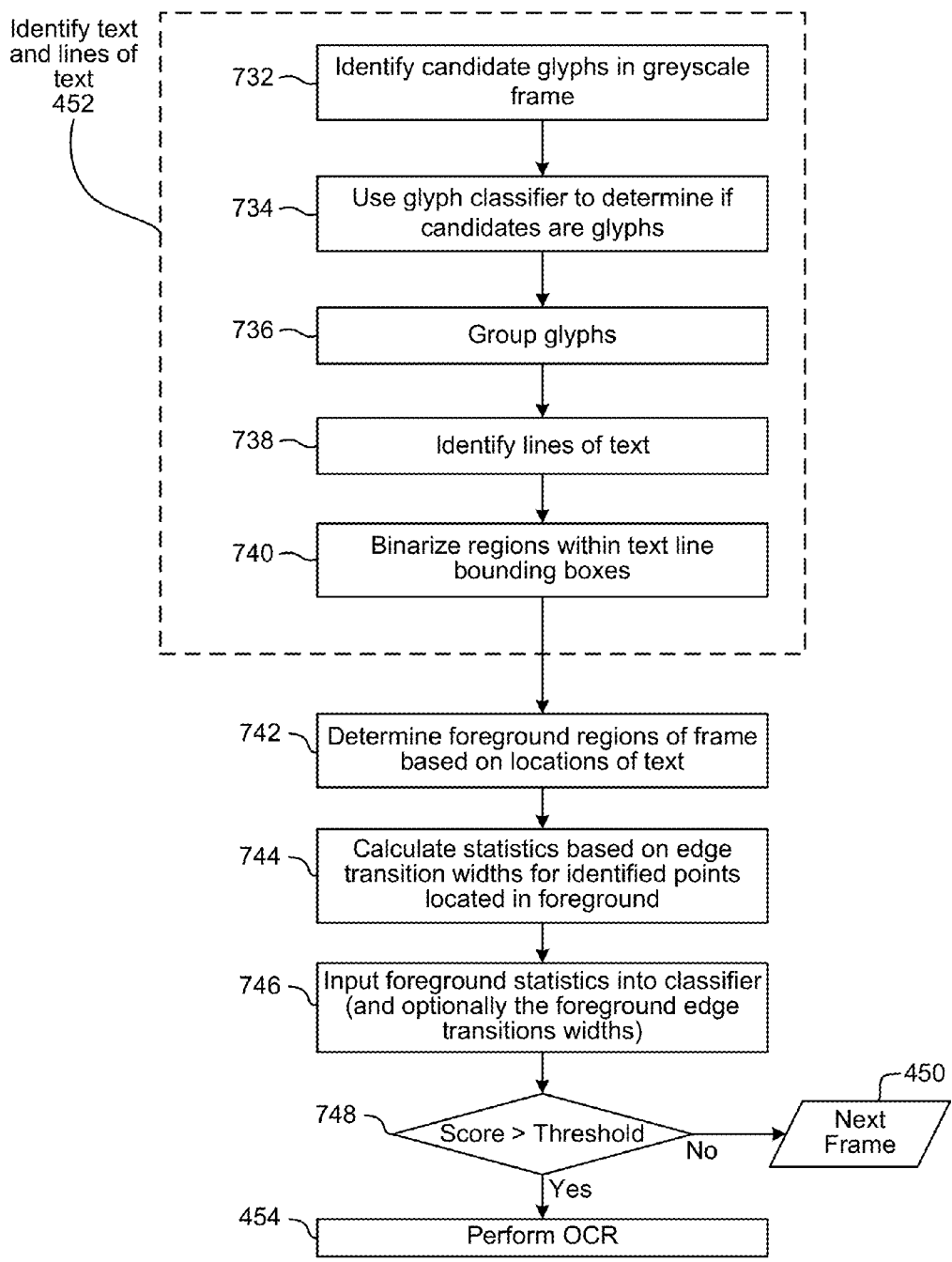
FIG. 7 expands on the process in FIG. 4.

FIG. 7 expands on identifying text and lines of text (452) and adds additional process steps that can be used to reject blurry frames.

A set of candidate glyph regions are identified (732) using a technique such as maximally stable extremal regions (MSERs) on a grayscale version of a captured image frame. MSERs are a method of blob detection in images. Each "blob" contains a pixel intensity pattern that the MSER algorithm determines might convey a text character or glyph (i.e., is a "candidate" region that probably includes a text character or a glyph), but further processing is required to determine whether each candidate region (i.e., each blob) comprises an actual character or glyph.

MSER candidate region detection algorithms are described by J. Matas, O. Chum, M. Urban, and T. Pajdla. in "Robust wide baseline stereo from maximally stable extremal regions," published in the Proceedings of the British Machine Vision Conference, pages 384-396, in 2002, the contents of which are incorporated herein by reference for explanation of MSER detection algorithms. Numerous refinements and improvements on MSER detection algorithms have been published since the 2002 Matas paper, and the MSER detection algorithms that may be used with the disclosed processes are not limited to the original algorithms in the 2002 paper. Other image processing algorithms may be used instead of, or in combination with, MSER detection algorithms in order to identify candidate character locations in the captured image.

MSERs are well-suited to extracting elements where an image element is warped or skewed, and are relatively unaffected by variations in image intensities. Although some MSER candidate regions may not correspond to text/glyphs, the MSER algorithm reduces overall computational overhead by identifying the regions of the image that may contain text/glyphs, since determining whether a region is a true character location is ordinarily more computationally intensive than the MSER algorithm.

A plurality of features are identified for each of the MSER regions and input (734) into a trained glyph classifier in order to determine whether the MSER is or is not a glyph/text character. The trained glyph classifier applies one or more adaptive models to determine if an MSER is a glyph. The adaptive model may be stored in a database or integral to the classifier, and determines whether patterns identified when the system was trained are or are not present in the data. As discussed above, examples of classifiers include Support Vector Machines (SVMs), neural networks, decision trees, AdaBoost (short for "Adaptive Boosting") combined with decision trees, and random forests. In some of these classifiers (e.g., neural networks), the models for different objects may not be discrete models, but rather, aspects of a single integrated model that can be used to identify a plurality of different objects The order of the remaining steps to identify text and lines of text (452) varies depending upon the particular processing pipeline. As illustrated, positively-identified glyphs are grouped (736) (e.g., grouping adjacent glyphs/letters into words). Lines of text in the image are identified (738). Text-line identification techniques are known in the art, and any technique may be used. The image is binarized (740). Binarization may, among other things, binarize content within identified text line bounding boxes, and blank areas of the image outside of the text line bounding boxes, setting those areas to be black or white (depending upon which constitutes the background color for the image). A bounding box characterizes the borders of the combined glyphs comprising the line, and corresponds to a rectangle enveloping the text line.

In addition, binarization (740) may be configured to set the foreground color to black (i.e., set the color of text to black) and the background color to white independent of how the text appeared in the original image (e.g., turning light text on a dark background into black text on a white background, as well as turning dark text on a light background into black text on a white background). "Black" and "white" are abstractions in any case, as binarization produces a two-dimensional array of 1-bit elements, and whether a "zero" constitutes "black" or "white" does not matter, so long as the process is configured to distinguish which digital state corresponds to foreground, and which digital state corresponds to background.

The areas of the frame containing text lines may be used to distinguish the foreground of the image from the background of the image. Although text may occur in the background, the likelihood is that text in the frame that is of value will be in-focus in the foreground of the image.

Therefore, having determined (742) a foreground region or regions of the frame based on locations of the text, a new set of statistics based on the edge transition widths may be calculated (744) for edge points 542 that are located within the foreground. The foreground may be defined, for example, as the areas within the text line bounding boxes, and a configurable area surrounding the bounding boxes, such as an area extending ten pixels on each side of a bounding box. The configurable area may be a fixed number of pixels, may be determined as a percentage of the size of the image or the bounding box, may be determined based on proximity to adjacent text line bounding boxes, etc. Edge transition widths for edge points 542 that are within the foreground region provide an indication of how sharp or blurry the areas containing the text are, which is relevant to how accurate OCR will be. In comparison, edge points 542 that are not proximate to the text may relate to background features who's blurriness is irrelevant to OCR.

Although not illustrated in FIG. 7, sharp edge transitions widths from the foreground areas may be excluded when calculating the feature statistics, as discussed above in connection with step 414 in FIG. 4. The same sharpness/blur-related statistics and other feature metrics may be calculated as discussed above in connection with steps 416 and 418 in FIG. 4, or the set of statistics and other feature metrics may be different (e.g., a smaller set of sharpness/blur statistics, a reduced set of other feature metrics, etc.). The new set of statistics are input (746) into a trained classifier, along with any other feature metrics, as discussed above in connection with step 418 in FIG. 4.

Since this second set of metrics serve as a refinement of frame selection, to increase the system efficiency, there is no need to conduct a frame selection with the full set of metrics that were used in the first pass (416, 418). Instead, a sharpness metric or metrics that focus more on the recognizable text is desired. For example, "just noticeable blurriness" has been proposed as a perceptual-based image sharpness metric by Rony Ferzli and Lina J. Karam in "A No-Reference Objective Image Sharpness Metric Based on the Notion of Just Noticeable Blur (JNB)," IEEE Transactions on Image Processing, vol. 18, no. 4, pp. 717-728, April 2009, incorporated by reference herein. An experiment may be conducted to measure the "just noticeable blurriness," which is defined as the minimum amount of perceived blurriness around an edge by human subjects. Edge transition width metrics that have a high correlation with the "just detectable blurriness" are particularly well suited for this second pass, and the image classifier model (in step 746) applied to score these feature metrics may be trained independently of the image classifier used in the first pass (in step 418). Applying a just noticeable blurriness threshold to the text regions helps to reject true negatives before send the binary image to the OCR engine.

If the classifier score indicates that the frame is a good quality frame based on the sharpness of the foreground areas containing text (748 "Yes"), then OCR is performed on the frame (454). Otherwise, the frame is rejected (748 "No") and the process proceeds to the next frame 450 upon receipt, skipping OCR for the current frame.

Training the image classifier requires establishing a "ground truth." In machine learning, the term "ground truth" refers to the accuracy of a training set's classification for supervised learning techniques. Frame quality annotation is important to provide ground truth for text detection purposes. A conventional approach is to conduct an experiment with human subjects to subjectively label the quality of a frame based on their viewing experience. This works when the goal of image quality measurement is to tell how the human vision system responds to the defect in the image. However, the purpose of frame selection in this system 100 is detecting a text region, generating binary image, and recognizing the text in the binarized image using an OCR engine. The machine OCR system may respond differently from a human vision system. As a result, a "good" frame may be defined such that the binary image contains recognizable text and OCR engine returns a high level of accuracy (e.g., a statistical "F-score"). Since the OCR accuracy score is determined by many factors that are irrelevant to the sharpness of the frame, frame selection accuracy is determined using an intermediate result—a binary image as a reference to label the quality of a frame, as binarization is a performed as a pre-processing step of OCR.

Figure 8:
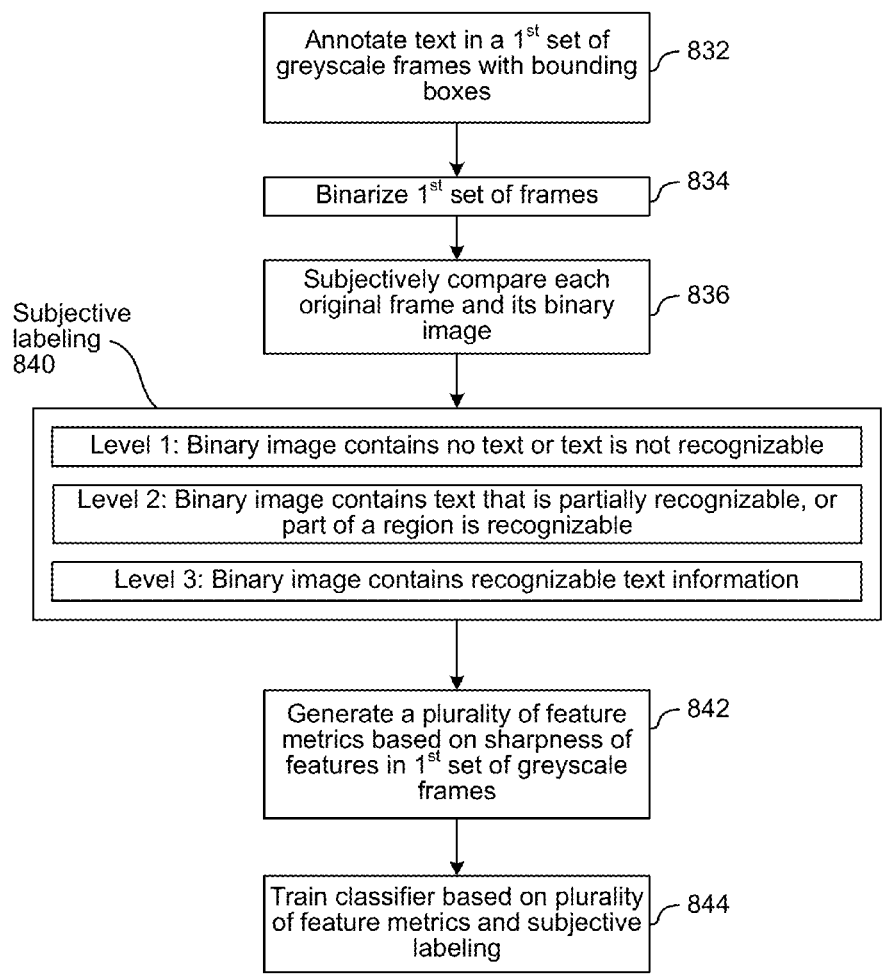
FIG. 8 illustrates a process for establishing "ground truth" for a classifier used by the system of FIG. 1.

FIG. 8 illustrates a process for establishing ground truth for a supervised learning computer system serving as an image classifier. The illustrated process is performed by a computer such as a computer device 110 and/or a supporting computer device 1112, soliciting subjective information about frames from one or more human users. Two distinctions with the conventional approach are that the evaluation of frame sharpness, as will be described further below, is based in part on a binarized version of the frame, since binarized images are used for OCR, and that the evaluation of accuracy/efficacy is based on the state of the image after binarization, but before OCR is performed (as compared to evaluation based on OCR accuracy). Accuracy of an OCR system depends upon a variety of factors which is a reason why the conventional approach of evaluating accuracy based on OCR results can lead to a flawed ground truth.

Sample greyscale frames containing text are annotated with bounding boxes (832) to identify text in the frames. Annotation may be performed by displaying the sample greyscale frames on a display for a user. The user is provided with a user interface to draw a rectangle around each cluster or line of recognizable text in a frame, demarcating the text. The frame coordinates of each rectangle are saved to be used as a text bounding box. The computer then generates binarized (834) versions of each frame, using the bounding boxes to determine what areas to binarize and what areas to blank, as described above in connection with step 740.

After binarization, the computer displays each greyscale frame with its binarized counterpart, providing the user a choice of subjective labels that the user can assign the images. A human user compares each displayed original frame with its binary counterpart (836), and chooses a subjective label (840) for each pair of frames. The subjective labels characterize whether text information is recognizable in the binary image, with the greyscale image being displayed for reference. An example of the three subjective levels that may be used for labelling are: Level 1: If the binary image contains no text information, or the text is definitely not recognizable, the frame is considered as a bad frame. Level 2: If the binary image contains text that is partially recognizable, or part of a region is recognizable, the frame is at intermediate level. Level 3: If the binary image contains recognizable text information, the frame is considered as a good frame. When the greyscale images are displayed for comparison (836) to the user, the bounding boxes may be included in the displayed image to highlight the location of the text.

A plurality of sharpness feature metrics 842 are generated from the greyscale frame, such as those discussed above in connection with steps 130, 416, and 744 (e.g., statistics relating to edge transition widths), and other metrics such as those discussed by Ferzli and Karam. If the image classifier is to be trained for first-pass frame selection as discussed with FIGS. 1 and 4, the feature metrics may be based on the whole frame, and/or features that occur within or proximate to the bounding boxes. If the image classifier is being trained for second-pass frame selection as discussed with FIG. 7, the feature metrics may be based on the features that occur within or proximate to the bounding boxes.

Based on the subjective labelling 840 and the plurality of sharpness feature metrics 842, the computer applies (844) a machine-learning based method to train the image classifier to classify frames as a good frame or a bad frame. A comprehensive training set with clear definitions of "good frame" improves classification accuracy.

A comprehensive training data set may cover variant scenes and different use cases (e.g., out of focus, large motion between frames, stable frame but out of focus, low contrast, glare, etc.). Preferably, training frames are taken or loaded from videos shot on devices of the type that will utilize the frame selection process (e.g., as discussed with FIGS. 1, 4 and 7).

This approach produces a ground truth where the image classifier is not just classifying based merely on a level of sharpness/blur in a frame, but rather, based on how the level of sharpness/blur in a frame will impact the legibility of text in a binarized version of the frame. This labelling/training approach is optimal for building image classifier models for both the first pass (e.g. steps 416-420) and the second pass (e.g., steps 744-748).

Referring back to FIGS. 1, 4, and 7, when the frame selection process is performed by the system 100, the calculation of feature metrics is one of the most computationally costly aspects. It is therefore desirable to optimize the set of feature metrics so that the system consistently distinguishes between sharp and blurry frames, so as to reduce the computational burden of frame selection.

Figure 9A:
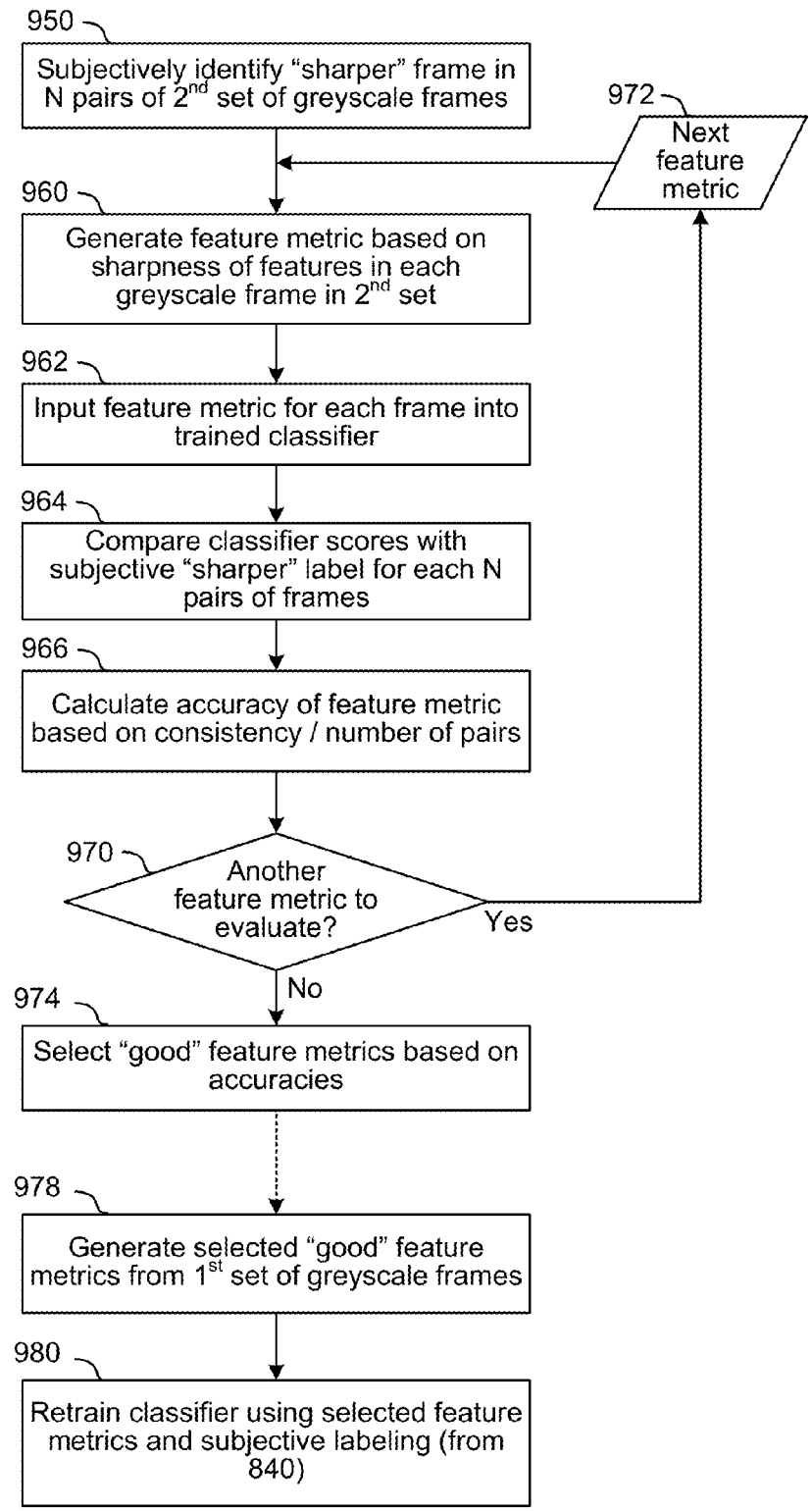
FIGS. 9A and 9B illustrate processes for evaluating the efficacy of sharpness features used by the classifier.
Figure 9B:
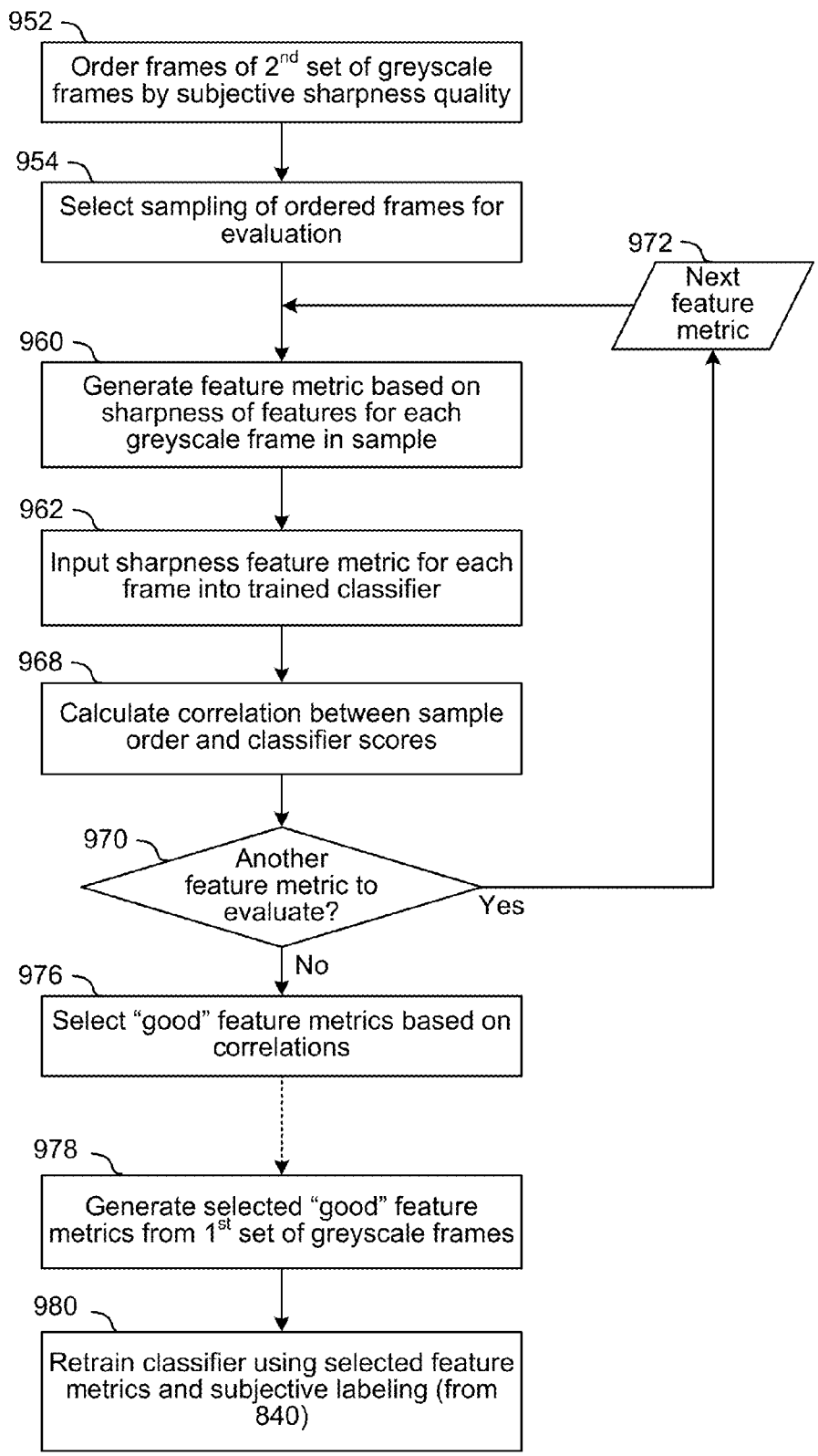

FIGS. 9A and 9B are examples of processes to evaluate and refine the feature metrics generated in step 842 to initially train the image classifier.

Referring to FIG. 9A, the computer displays N pairs of greyscale frames on a display for a human reviewer, together with a user interface for the human reviewer to choose (950) which frame of the pair is subjectively "sharper." The computer generates (960) a feature metric related to blur/sharpness for each of the greyscale frames. The generated feature metric is a feature metric that was among the plurality generated in FIG. 8 (i.e., 842) to initially train the image classifier (844). At least some of the sharpness-related feature metrics to be evaluated are statistics based on edge transition widths, as discussed above in connection with FIGS. 1 to 7.

The sharpness feature metric is input (962) into the image classifier trained in FIG. 8. The computer compares (964) the classifier score with the subjective "sharper" label for each of the N pairs of frames, and an accuracy of the metric is calculated (966) based on the consistency of the image classifier scores versus the subjective labels, divided by the number of frames. If there are more feature metrics to evaluate that were used to train the classifier in FIG. 8 (970 "Yes"), the evaluation process is repeated for the next metric (972), generating (960) the next sharpness feature metric to be evaluated.

When the evaluations of the metrics that were used to train the classifier in FIG. 8 are complete (970 "No"), "good" feature metrics are selected (974) based on their accuracies. For example, the computer may select feature metrics based on, among other things, which feature metrics exceed a threshold accuracy, and/or select a set of the "P" most accurate metrics, where P is an integer greater than one (e.g., the three most accurate metrics). Other performance-related information may be accumulated for each feature metric corresponding to that metric's computational cost (e.g., the average number of processor clock cycles per frame required to compute the metric), with heuristics applied to favor selection of metrics that have a lower computational cost over those with similar accuracy but higher computational cost.

The selected feature metrics reduce the number of feature metrics that need to be calculated for frame selection (e.g., 130, 416, 744) as discussed above in connection with FIGS. 1 to 7, reducing the computational cost of determining whether a frame is suitable for OCR by reducing the number of feature metrics to be calculated (in comparison with FIG. 8). In addition, after the good feature metrics are identified, they can be applied (978) to the greyscale frames that were subjectively labelled (840) in FIG. 8, and the classifier may retrained with the optimal metrics, repeating step 844 using the optimal metrics (from 978) and the subjective labels (from 840), reducing the file size of the resulting model and further reducing complexity.

The second evaluation metric process is illustrated in FIG. 9B. A set of frames are prepared that includes frames at different sharpness levels. The computer displays the frames together with a user interface enabling a human review to order (952) the frames based on subjective sharpness quality. From the ordered set, the computer selects (954) frames so as to sample frames from across the range of sharpness-blur quality (e.g., selecting every tenth ordered frame).

The computer then generates (960) a sharpness feature metric for each of the greyscale frames. The sharpness feature metric is a feature metric that was among the plurality generated in FIG. 8 (i.e., 842) to initially train the image classifier (844). At least some of the sharpness-related feature metrics to be evaluated are statistics based on edge transition widths, as discussed above in connection with FIGS. 1 to 7.

The sharpness feature metric is input (962) into the image classifier trained in FIG. 8. The computer calculates (968) a correlation value between the sample order and the order resulting from the classifier score, using a correlation techniques such as a Pearson correlation or Spearman correlation. If there are more metrics to evaluate that were used to train the classifier in FIG. 8 (970 "Yes"), the process is repeated for the next metric (972), generating (960) the next sharpness feature metric to be evaluated.

When the evaluations of the metrics that were used to train the classifier in FIG. 8 are complete (970 "No"), "good" feature metrics are selected (976) based on the metrics exhibiting the strongest correlation. For example, the computer may select feature metrics based on, among other things, which feature metrics exceed a threshold level of correlation, and/or select a set of the "R" highest correlations, where R is an integer greater than one (e.g., the three closest correlations between the subjective ordering and the classifier scores). Other performance-related information may be accumulated for each feature metric corresponding to that metric's computational cost (e.g., the average number of processor clock cycles per frame required to compute the metric), with heuristics applied to favor selection of metrics that have a lower computational cost over those with similar correlations but higher computational cost.

The selected feature metrics reduce the number of feature metrics that need to be calculated for frame selection (e.g., 130, 416, 744) as discussed above in connection with FIGS. 1 to 7, reducing the computational cost of determining whether a frame is suitable for OCR by reducing the number of feature metrics to be calculated (in comparison with FIG. 8). In addition, after the good feature metrics are identified, they can be applied (978) to the greyscale frames that were subjectively labelled (840) in FIG. 8, and the classifier may retrained with the optimal metrics, repeating step 844 using the optimal metrics (from 978) and the subjective labels (from 840), reducing the file size of the resulting model and further reducing complexity.

The evaluation processes in FIGS. 9A and 9B may be combined to determine a set of feature metrics that provide both good accuracy and good correlation. For example, the computer may compare the P best accuracy metrics and the R best correlation metrics, and the accuracy metrics that occur in both sets may be selected as "good" feature metrics.

In addition, the subjective review of the frames in step 950 in FIG. 9A and step 952 in FIG. 9B may be performed as a combined process. For example, the computer may be configured to execute a sorting algorithm such as a binary tree sort or a bubble sort. However, instead of the computer performing the comparisons between frames that drive the sort (i.e., the comparisons used to reorder frames), the computer instead uses the user's subjective determination of sharpness between combinations of frame pairs to drive the sort. The end result is that the computer acquires subjective data on combinations of pairs (step 950), and reorders the frames based on subjective sharpness.

Image sharpness metrics are considered as classification features in the system 100. In order to complete text recognition in "real time," or as images are received as part of the video feed, sharpness features are selected to provide a high accuracy and low computational cost. Statistics such as the mean and variance of edge transition widths, as discussed above (e.g., in connection with 416 in FIG. 4), evaluate as providing a high level of accuracy using the evaluation process in FIG. 9A.

In addition to being useful for training the classifier, accuracy and correlation are also useful to determine which metrics provide the best indicia of image sharpness, and may be used to test the utility of other sharpness metrics, beyond those discussed herein.

Figure 10:
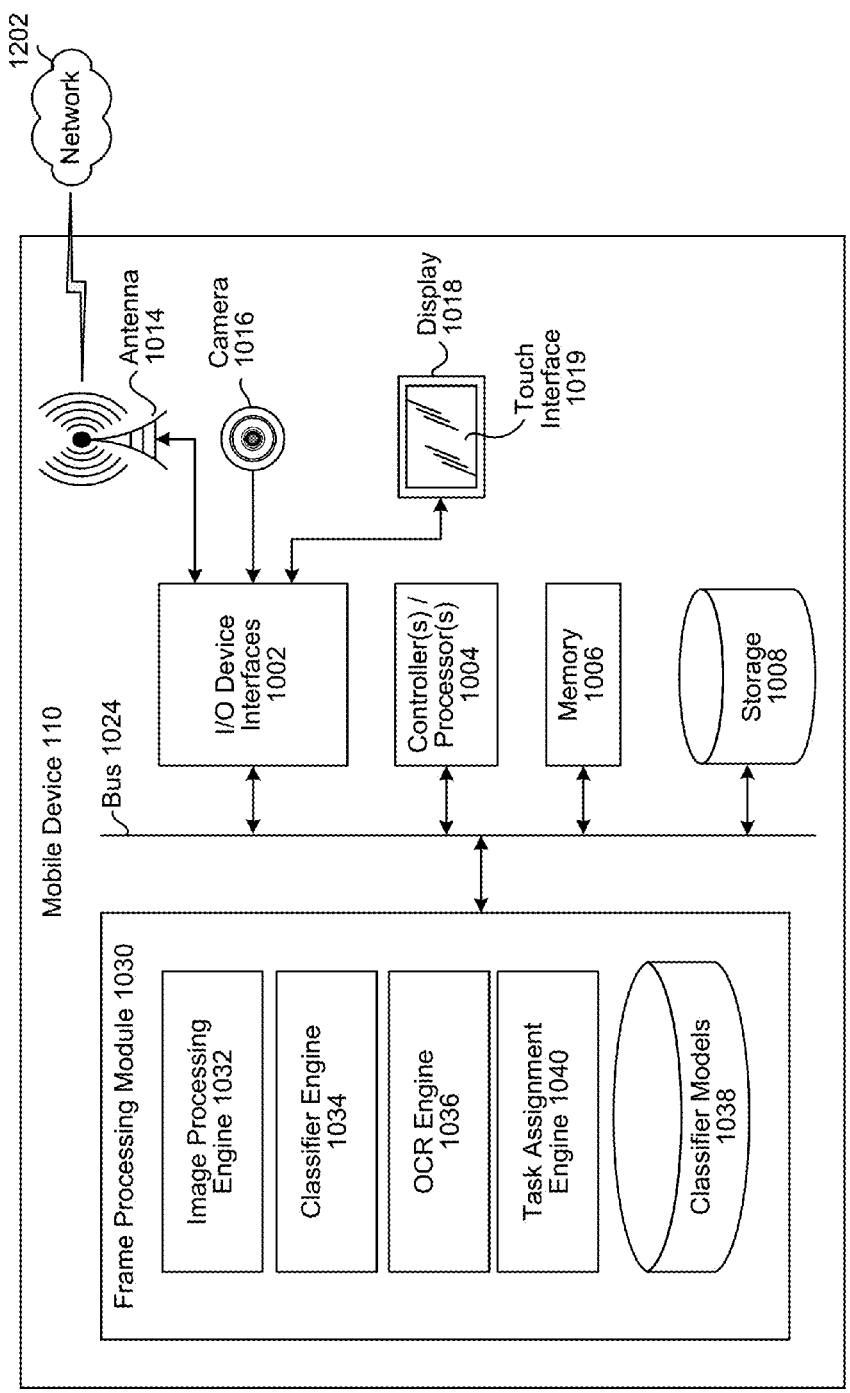
FIG. 10 is a block diagram conceptually illustrating example components of a device of the system in FIG. 1.

FIG. 10 is a block diagram conceptually illustrating example components of the device 110 of the system 100. In operation, the device 110 may include computer-readable and computer-executable instructions that reside on the device 110, or that may reside on a network-connected device operating in conjunction with device 110, as will be discussed further below.

As illustrated in FIG. 10 the device 110 may include wireless network radio connectivity (e.g., antenna 1014), one or more cameras (1016), a display 1018, and a user interface such as touch interface 1019. "Camera" includes image capture systems used to capture images, and includes (among other things), cameras used for photography and for the capture of video. Image scanners such as flat-bed optical scanners may be substituted for a camera to capture the image or video frames (e.g., captured frame 120).

The display 1018 may be a display of any suitable technology, such as a liquid crystal display, an organic light emitting diode display, electronic paper, an electrochromic display, or other suitable component(s). The cameras 1016, display 1018, and other components may be integrated into the device 110, or may be separate, connected to the device 110 by a wired or wireless connection.

The device 110 may include an address/data bus 1024 for conveying data among components of the device 110. Each component within the device 110 may also be directly connected to other components in addition to (or instead of) being connected to other components across the bus 1024.

The device 110 may include one or more controllers/processors 1004, that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The device 110 may also include a data storage component 1008, for storing data and controller/processor-executable instructions (e.g., instructions to perform the processes illustrated in, and discussed in connection with, FIGS. 1 to 7, and the portions of FIGS. 8, 9A, and 9B other than the subjective assessments in steps 836, 840, 950, and 952). The data storage component 1008 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1002.

Computer instructions for operating the device 110 and its various components (such as the engines 1032 to 1036 and 1040 of the frame processing module 1030) may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The device 110 includes input/output device interfaces 1002. A variety of components may be connected through the input/output device interfaces 1002, such as the display 1018, a speaker (not illustrated), a microphone (not illustrated), and the user interface (e.g., touch interface 1019). The input/output device interfaces 1002 may also include an interface for an external peripheral device connection such as universal serial bus (USB), Thunderbolt or other connection protocol. The input/output device interfaces 1002 may also include a connection to one or more networks 1202 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1202, the system 100 may be distributed across a networked environment, as will be discussed further below with FIG. 12.

The device 110 further includes a frame processing module 1030 that may perform the processes discussed in connection with FIGS. 1 to 9B (excluding the subjective steps), and/or works in conjunction with another device in the system 100. For example, a first device 110 may include the camera 1016 and capture a frame 120, whereas a second device 110 (or a support device 1112 such as a server) includes all or part of the frame processing module 1030 that processes the captured frame 120, such as performing OCR (134, 454).

The frame processing module 1030 includes an image processing engine 1032. Among other things, the image processing engine 1032 performs steps 122 to 130, 402 to 450, 732 to 748, 834, 842, and 954 to 978. The image processing engine 1032 may also output frames to the display 1018 for user review with user interface options, such as described in conjunction with steps 832, 836, 840, 950, and 952. The user interface options may be selected by, for example, using the touch interface 1019. If any other pre-processing of the frame is (e.g., conversion to greyscale prior to processing), that may also be performed by the image processing engine 1032.

A classifier engine 1034 of the frame processing module 1030 may be used to classify (in 132, 418, 734, 746, and 962) image sharpness/blur and/or candidate character locations. Among other things, the classifier engine 1034 may be a Support Vector Machine (SVM) classifier employing a Radial Basis Function (RBF) kernel. The classifier models are stored in storage 1038, which may be a section of storage 1008. The sharpness blur classifier models may be created by training, as referred to in step 844 and 980, where the image processing engine 1132 provides the training data to a subroutine configured to train the classifier engine 1034 by repetition.

An optical character recognition (OCR) engine 1036 of the frame processing module 1030 performs OCR (134, 454) on the processed frame. Any OCR algorithm or algorithms may be used, as known in the art.

Figure 11:
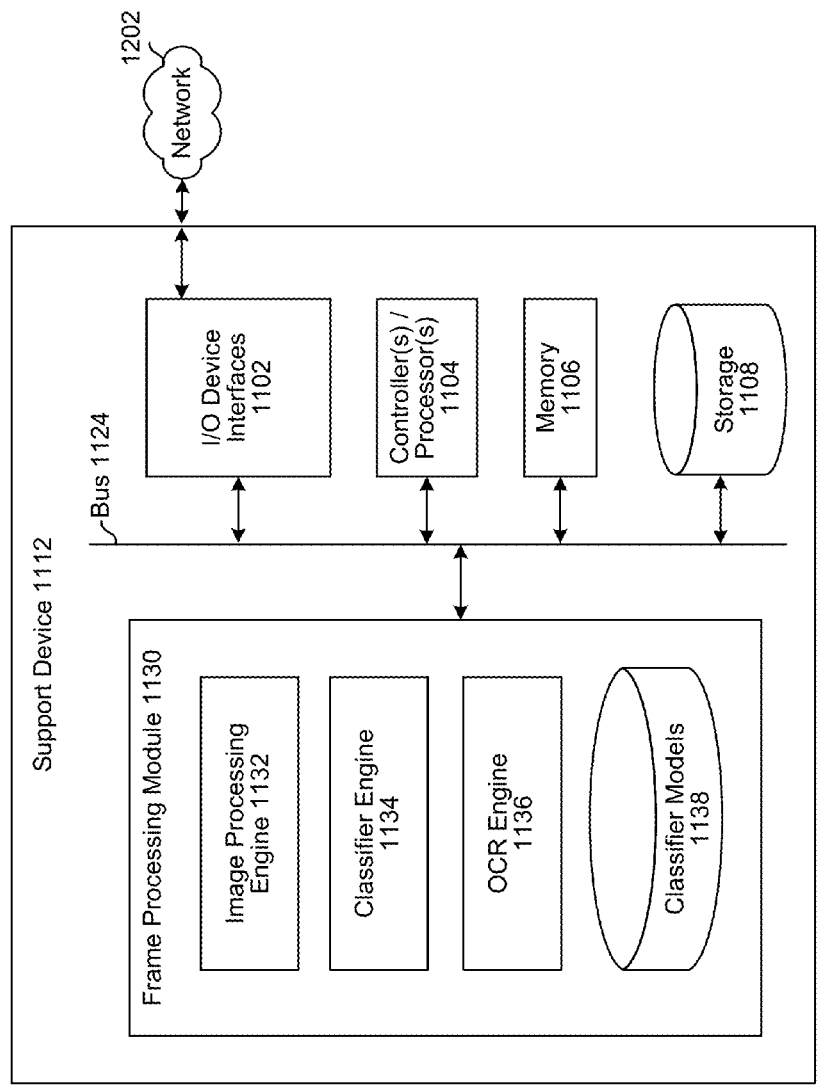
FIG. 11 is a block diagram conceptually illustrating an illustrating example components of a network-connected support device of the system FIG. 1.

FIG. 11 is a block diagram conceptually illustrating example components of a network-connected support device 1112 of the system 100. While some devices 110 that capture the frames(s) may be able to execute their own processing pipeline, the task assignment engine 1040 of a device 110 may delegate some tasks to the support device 1112 to process the captured frames (e.g., delegating OCR (134, 454) processing to the support device 1112). The task assignment engine 1040 may transmit the data necessary to perform pipeline step(s) (e.g., a processed binarized image), together with an instruction to perform the pipeline step(s) and return send back the results. The device 110 may output the received results (e.g., via display 1018). In operation, the support device 1112 may include computer-readable and computer-executable instructions that reside on the support device 1112.

The support device 1112 may include an address/data bus 1124 for conveying data among components of the support device 1112. Each component within the support device 1112 may also be directly connected to other components in addition to (or instead of) being connected to other components across the bus 1124.

The support device 1112 may include one or more controllers/processors 1104, that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The support device 1112 may also include a data storage component 1108, for storing data and controller/processor-executable instructions (e.g., instructions to perform the processes illustrated in, and discussed in connection with, FIGS. 1 to 7, and the portions of FIGS. 8, 9A, and 9B other than the subjective assessments in steps 836, 840, 950, and 952). The data storage component 1108 may include one or more non-volatile storage types such as magnetic storage, optical storage, solid-state storage, etc. The support device 1112 may also be connected to removable or external non-volatile memory and/or storage (such as a removable memory card, memory key drive, networked storage, etc.) through the input/output device interfaces 1102.

Computer instructions for operating the support device 1112 and its various components (such as the engines 1132 to 1136 of the frame processing module 1130) may be executed by the controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The support device 1112 includes input/output device interfaces 1102. A variety of components may be connected through the input/output device interfaces 1102. The input/output device interfaces 1102 may also include an interface for an external peripheral device connection such as universal serial bus (USB), Thunderbolt or other connection protocol. The input/output device interfaces 1102 may also include a connection to one or more networks 1202 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1202, the system 100 may be distributed across a networked environment, as will be discussed further below with FIG. 12.

The support device 1112 further includes a frame processing module 1130 that performs the processes discussed in connection with FIGS. 1 to 9B (excluding the subjective steps), and/or works in conjunction with other devices in the system 100. For example, a mobile device 110 may include the camera(s) 1016 and capture the frame to be processed, whereas the support device 1112 includes part of the frame processing module 1130 that processes the captured frame.

The frame processing module 1130 includes an image processing engine 1132. Among other things, the image processing engine performs steps 122 to 130, 402 to 450, 732 to 748, 834, 842, and 954 to 978. The image processing engine

1132 may also output frames to the of the display 1018 or some other display for user review, together with user interface options, such as described in conjunction with steps 832, 836, 840, 950, and 952. The user interface options may be selected by, for example, using the touch interface 1019. If any other pre-processing of the frame is performed prior to classification (e.g., conversion to greyscale prior), that may also be performed by the image processing engine 1132.

A classifier engine 1134 of the frame processing module 1130 may be used to classify (in 132, 418, 734, 746, and 962) image sharpness/blur and/or candidate character locations. Among other things, the classifier engine 1134 may be a Support Vector Machine (SVM) classifier employing a Radial Basis Function (RBF) kernel. The classifier models are stored in storage 1138, which may be a section of storage 1108. The sharpness blur classifier models may be created by training, as referred to in step 844 and 980, where the image processing engine 1132 provides the training data to a subroutine configured to train the classifier engine 1034 by repetition.

An optical character recognition (OCR) engine 1136 of the symbol recognition module 1130 performs OCR (134, 454) on the processed image. Any OCR algorithm or algorithms may be used, as known in the art.

How tasks are divided between the mobile device 110 and the support device 1112 may be determined dynamically by task assignment engine 1040 of the symbol recognition module 1030. The task assignment engine 1040 may determine a speed of the connection via network 1202 to the support device 1112. Based on criteria such as the speed of the network connection, the computational complexity of the process steps, and the computational capabilities of the controller(s)/processor(s) 1004, the task assignment engine 1040 may apply load balancing heuristics to dynamically divide processing steps between the other engines of the frame processing module 1030 of the device 110 and the frame processing module 1130 of the support device 1112.

The components of the device 110 as illustrated in FIG. 10 and the support device 1112 as illustrated in FIG. 11 are exemplary, and may be a stand-alone device or may be included, in whole or in part, as a component of a larger device or system. Although the examples of the classifier engines 1034 and 1134 described above are Support Vector Machines (SVMs), other trained classifiers may be used, such as neural networks, decision trees, AdaBoost (short for "Adaptive Boosting") combined with decision trees, and random forests.

While the candidate glyph identification (732) technique used by the system 100 has been described as being a MSER-based technique, other candidate region identification techniques may be used. For example, instead of MSERs (or in conjunction with MSERs), the candidate locations may be identified using histogram of oriented gradients (HoGs) and Gabor features.

HoGs are feature descriptors used in computer vision and image processing for the purpose of object detection. The HoG technique counts occurrences of gradient orientation in localized portions of an image, and is similar to that of edge orientation histograms, scale-invariant feature transform descriptors, and shape contexts. However, HoG is different from these other techniques in that it is computed on a dense grid of uniformly spaced cells and uses overlapping local contrast normalization for improved accuracy. Locally-normalized HoG descriptors offer particular performance advantages relative to other existing feature sets, computed on a dense grid of uniformly spaced cells and using overlapping local contrast normalizations.

Gabor features are identified by a Gabor filter, which is a linear filter used for edge detection. Frequency and orientation representations of Gabor filters are similar to those of the human visual system, and they have been found to be particularly appropriate for texture representation and discrimination. In the spatial domain, a two-dimensional Gabor filter is a Gaussian kernel function modulated by a sinusoidal plane wave, applying image decompositions to identify and recognize objects.

The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

Although processing is discussed in terms of greyscale frames, color frames may also be used, or one or more color channels from a color frame (e.g., red). Also, instead of thresholding the entire edge map as illustrated in FIG. 3, a threshold may be used when the edge map is scanned to identify points along edges, with points being selected based on the point/pixel's value relative to the threshold.

Figure 12:
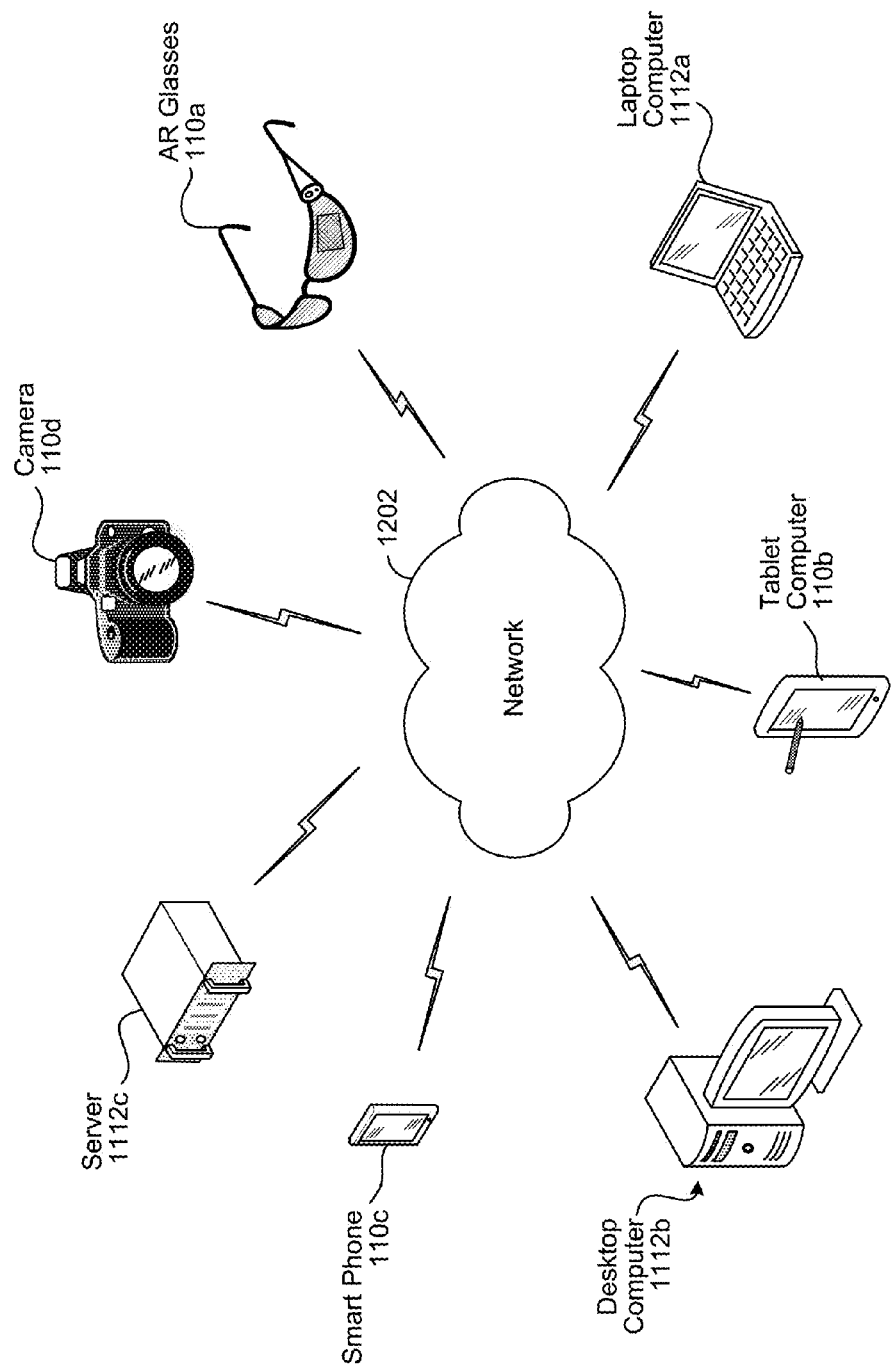
FIG. 12 illustrates an example of a computer network for use with the system.

As illustrated in FIG. 12, multiple devices (110*a* to 110*c*) may contain components of the system 100 and the devices may be connected over a network 1202. Network 1202 may include a local or private network or may include a wide network such as the internet. Devices may be connected to the network 1202 through either wired or wireless connections. For example, augmented reality (AR) glasses 110*a*, a tablet computer 110*b*, a smart phone 110*c*, and a camera 110*d* may be connected to the network 1202 through a wireless service provider, over a WiFi or cellular network connection or the like. Other devices are included as network-connected support devices 1112, such as a laptop computer 1112*a*, a desktop computer 110*b*, and a server 1112*c*. The support devices 1112 may connect to the network 1202 through a wired connection or wireless connection. Networked mobile devices 110 may capture frames using one-or-more built-in or connected camera 1016 or frame capture devices, with processing performed by a frame processing module 1030 of the same device or another device connected via network 1202, such as the frame processing module 1130 of a support device 1112.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, trained classifiers, and optical character recognition (OCR) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the frame processing modules 1030 and 1130 may be implemented as firmware in hardware. For example, portions of the image processing engine 1032 and 1132 of the modules 1030 and 1130 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A computing device comprising:
   at least one processor; and
   a memory including instructions operable to be executed by the at least one processor, to configure the at least one processor to:
      binarize a first image frame to generate a second binarized image frame;
      output the second binarized image frame;
      receive a first indication indicating that the second binarized image frame contains at least one of: no text, text that is not recognizable, text that is partially recognizable, or text that is recognizable;
      determine a first feature metric characterizing image sharpness;
      generate, using the first feature metric, a first feature value associated with the first image frame;
      train an image classifier to select an input image frame for optical character recognition using at least the first feature metric and the first indication;
      output a first pair of image frames including a third image frame and a fourth image frame;
      receive, for the first pair of image frames, a second indication indicating which image frame of the first pair of image frames is sharper;
      generate, using the first feature metric, a second feature value associated with the third image frame;
      generate, using the first feature metric, a third feature value associated with the fourth image frame;
      receive a first score for the third image frame, the first score being output by the image classifier and based on the second feature value;
      receive a second score for the fourth image frame, the second score output by the image classifier and based on the third feature value;
      generate first results indicating which of the first score and the second score is higher;
      compare the second indication with the first results;
      determine a first accuracy of the first feature metric based on a first consistency of the second indication with the first results;
      determine that the first accuracy of the first feature metric satisfies a selection criteria; and
      select the first feature metric for use in image frame selection.

2. The computing device of claim 1, the instructions to further configure the at least one processor to:
   generate, using a second feature metric, a fourth feature value associated with the third image frame;
   generate, using the second feature metric, a fifth feature value associated with the fourth image frame;
   receive a third score for the third image frame output by the image classifier, the third score based on the fourth feature value;
   receive a fourth score for the fourth image frame output by the image classifier, the fourth score based on the fifth feature value;
   generate second results indicating which of the third score and the fourth score is higher;
   compare the second indication with the second results;
   determine a second accuracy of the second feature metric based on a second consistency of the second indication with the second results;
   determine that the second accuracy of the second feature metric does not satisfy the selection criteria; and
   retrain the image classifier using a plurality of feature metrics and the first indication, wherein the plurality of feature metrics comprises the first feature metric but omits the second feature metric.

3. The computing device of claim 1, the instructions to further configure the at least one processor to:
   receive an order of sharpness indicating that a fifth image frame is sharper than a sixth image frame and the sixth image frame is sharper than a seventh image frame;
   generate, using the first feature metric, a fourth feature value associated with the fifth image frame;
   generate, using the first feature metric, a fifth feature value associated with the sixth image frame;
   generate, using the first feature metric, a sixth feature value associated with the seventh image frame;
   receive a third score output by the image classifier based on the fourth feature value;
   receive a fourth score output by the image classifier, the fourth score based on the fifth feature value;
   receive a fifth score output by the image classifier, the fifth score based on the sixth feature value;
   determine a first correlation between the order of sharpness and the third score, the fourth score and the fifth score output by the by the image classifier;
   determine that the first correlation satisfies a second selection criteria; and
   select the first feature metric for use in image frame selection.

4. The computing device of claim 3, wherein the first correlation is a Pearson correlation or a Spearman correlation.

5. The computing device of claim 3, the instructions to further configure the at least one processor to:
   generate, using a second feature metric, a seventh feature value associated with the fifth image frame;
   generate, using the second feature metric, an eighth feature value associated with the sixth image frame;
   generate, using the second feature metric, a ninth feature value associated with the seventh image frame;
   receive a sixth score output by the image classifier based on the seventh feature value;
   receive a seventh score output by the image classifier, the seventh score based on the eighth feature value;
   receive an eighth score output by the image classifier, the eighth score based on the ninth feature value;
   determine a second correlation between the order of sharpness and the sixth score, the seventh score and the eighth score output by the image classifier;
   determine that the second correlation does not satisfy the second selection criteria; and
   retrain the image classifier using a plurality of feature metrics and the first indication, wherein the plurality of feature metrics comprises the first feature metric but omits the second feature metric.

6. The computing system of claim 1, wherein the image classifier comprises one or more of a Support Vector Machine, a neural network, a decision tree, a decision tree combined with adaptive boosting, or a random forest.

7. A computer-implemented method comprising:
  binarizing a first image frame to generate a second binarized image frame;
  outputting the second binarized image frame;
  receiving a first indication indicating that the second binarized image frame contains at least one of: no text, text that is not recognizable, text that is partially recognizable, or text that is recognizable;
  determining a first feature metric characterizing image sharpness;
  generating, using the first feature metric, a first feature value associated with the first image frame;
  training an image classifier to select an input image frame for optical character recognition using at least the first feature metric and the first indication;
  receiving an order of sharpness indicating that a third image frame is sharper than a fourth image frame and the fourth image frame is sharper than a fifth image frame;
  generating, using the first feature metric, a second feature value associated with the third image frame;
  generating, using the first feature metric, a third feature value associated with the fourth image frame;
  generating, using the first feature metric, a fourth feature value associated with the fifth image frame;
  receiving a first score output by the image classifier based on the second feature value;
  receiving a second score output by the image classifier, based on the third feature value;
  receiving a third score output by the image classifier, based on the fourth feature value;
  determining a first correlation between the order of sharpness and the first score, the second score and the third score output by the image classifier;
  determining that the first correlation satisfies a selection criteria; and
  selecting the first feature metric for use in image frame selection.

8. The computer-implemented method of claim 7, further comprising:
  outputting a first pair of image frames including a sixth image frame and a seventh image frame;
  receiving for the first pair of image frames, a second indication indicating which of the first pair of image frames is sharper;
  generating, using the first feature metric, a fifth feature value associated with the sixth image frame;
  generating, using the first feature metric, a sixth feature value associated with the seventh image frame;
  receiving a fourth score for the sixth image frame, the fourth score output by the image classifier and based on the fifth feature value;
  receiving a fifth score for the seventh image frame, the fifth score output by the image classifier and based on the sixth feature value;
  generating first results indicating which of the fourth score and the fifth score is higher;
  comparing the second indication with the first results;
  determining a first accuracy of the first feature metric based on a first consistency of the second indication with the first results;
  determining that the first accuracy of the first feature metric satisfies a second selection criteria; and
  selecting the first feature metric for use in image frame selection.

9. The computer-implemented method of claim 8, further comprising:
  generating, using a second feature metric, a seventh feature value associated with the sixth image frame;
  generating, using the second feature metric, a eighth feature value associated with the seventh image frame;
  receiving a sixth score for the sixth image frame output by the image classifier based on the seventh feature value;
  receiving a seventh score for the seventh image frame output by the image classifier based on the eighth feature value;
  generating second results indicating which of the sixth score and the seventh score is higher;
  comparing the second indication with the second results;
  determining a second accuracy of the second feature metric based on a second consistency of the second indication with the second results;
  determining that the second accuracy of the second feature metric does not satisfy the second selection criteria; and
  retraining the image classifier using a plurality of feature metrics and the first indication, wherein the plurality of feature metrics comprises the first feature metric but omits the second feature metric.

10. The computer-implemented method of claim 7, wherein the first correlation is a Pearson correlation or a Spearman correlation.

11. The computer-implemented method of claim 7, further comprising:
  generating, using a second feature metric, a fifth feature value associated with the third image frame;
  generating, using the second feature metric, a sixth feature value associated with the fourth image frame;
  generating, using the second feature metric, a seventh feature value associated with the fifth image frame;
  receiving a fourth score output by the image classifier based on the fifth feature value;
  receiving a fifth score output by the image classifier, the fifth score based on the sixth feature value;
  receiving a sixth score output by the image classifier, the sixth score based on the seventh feature value;
  determining a second correlation between the order of sharpness and the fourth score, the fifth score and the sixth score output by the image classifier;
  determining that the second correlation does not satisfy the selection criteria; and
  retraining the image classifier using a plurality of feature metrics and the first indication, wherein the plurality of feature metrics comprises the first feature metric but omits the second feature metric.

12. The computer-implemented method of claim 7, wherein the image classifier comprises one or more of a Support Vector Machine, a neural network, a decision tree, a decision tree combined with adaptive boosting, or a random forest.

* * * * *